United States Patent
Engesser et al.

(10) Patent No.: US 7,570,456 B2
(45) Date of Patent: Aug. 4, 2009

(54) SPINDLE MOTOR HAVING A FLUID DYNAMIC BEARING SYSTEM

(75) Inventors: Martin Engesser, Donaueschingen (DE); Stefan Schwamberger, Hermsdorf (DE)

(73) Assignee: Minebea Co., Ltd. (JP)

( * ) Notice: Subject to any disclaimer, the term of this patent is extended or adjusted under 35 U.S.C. 154(b) by 478 days.

(21) Appl. No.: 11/325,126

(22) Filed: Jan. 4, 2006

(65) Prior Publication Data

US 2006/0158778 A1     Jul. 20, 2006

(30) Foreign Application Priority Data

Jan. 20, 2005   (DE) ...................... 10 2005 002 586
Aug. 3, 2005   (DE) ...................... 10 2005 036 396

(51) Int. Cl.
  *G11B 17/028*     (2006.01)
(52) U.S. Cl. .................................... 360/99.08
(58) Field of Classification Search .............. 360/99.08, 360/99.07
  See application file for complete search history.

(56) References Cited

U.S. PATENT DOCUMENTS 6,005,748 A * 12/1999 Heine et al. .............. 360/99.08
6,362,932 B1 * 3/2002 Bodmer et al. ........... 360/99.08
2006/0043808 A1 * 3/2006 Son et al. ...................... 310/90
2006/0255672 A1 * 11/2006 Flores et al. .................. 310/90

* cited by examiner

*Primary Examiner*—Julie Anne Watko
(74) *Attorney, Agent, or Firm*—Cooper & Dunham LLP

(57) ABSTRACT

The invention relates to a spindle motor having a fluid dynamic bearing system and comprises a rotor having a cylindrical shaft, a first bearing disk disposed at one end of the shaft and a second bearing disk that is disposed on the shaft at a spacing to the first bearing disk in such a way that an annular disk-shaped space is formed between the two bearing disks. A stator is provided that has an annular disk-shaped component which is disposed in the annular disk-shaped space formed by the rotor, the respective opposing bearing surfaces of the stator and of the rotor being separated from one another by a bearing gap filled with a fluid medium. The bearing system comprises at least one radial bearing formed between the outside circumference of the shaft and the inside circumference of the annular disk-shaped component and two axial bearings formed by the two end faces of the annular disk-shaped component and the respective opposing end faces of the bearing disks, an electromagnetic drive unit being provided to drive the rotor.

17 Claims, 3 Drawing Sheets

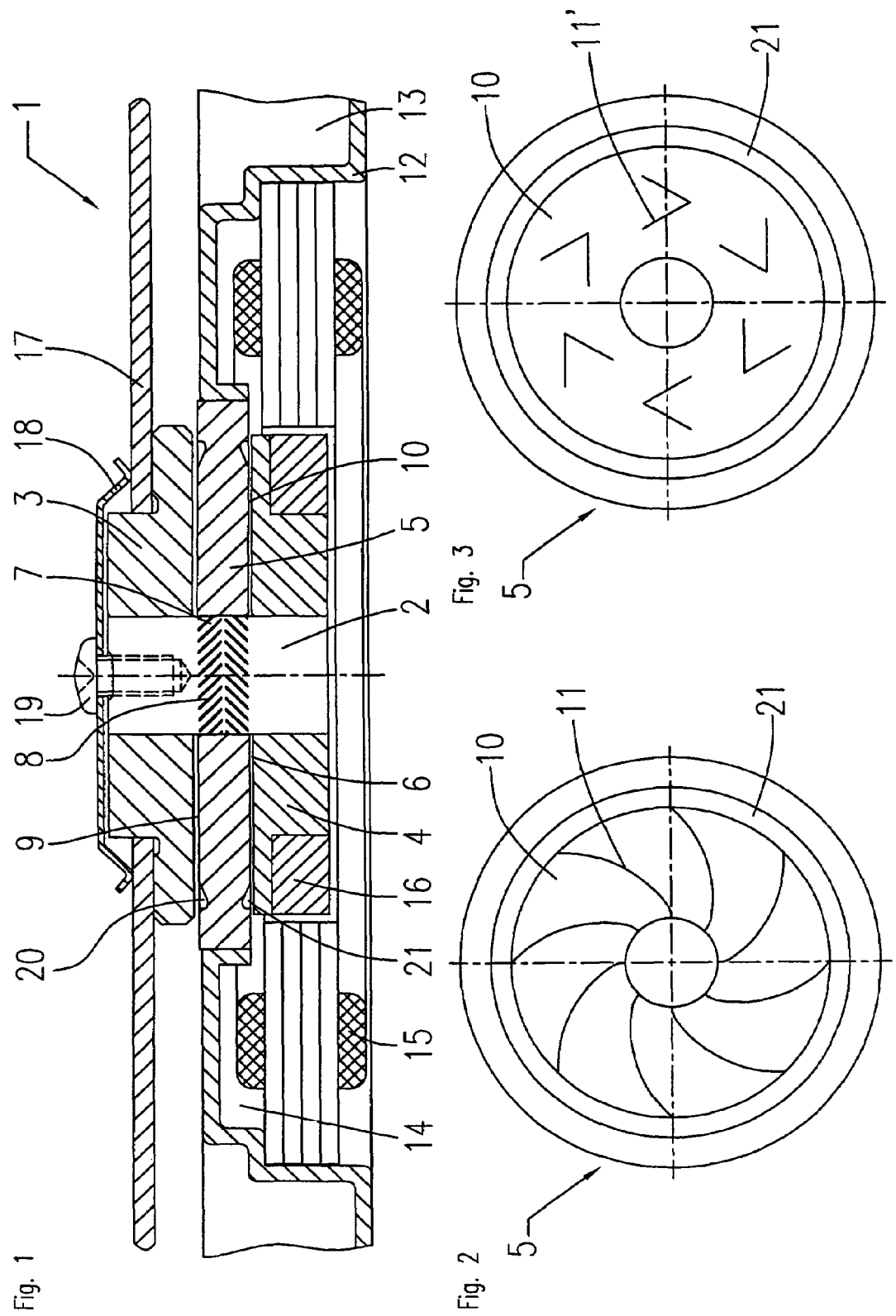

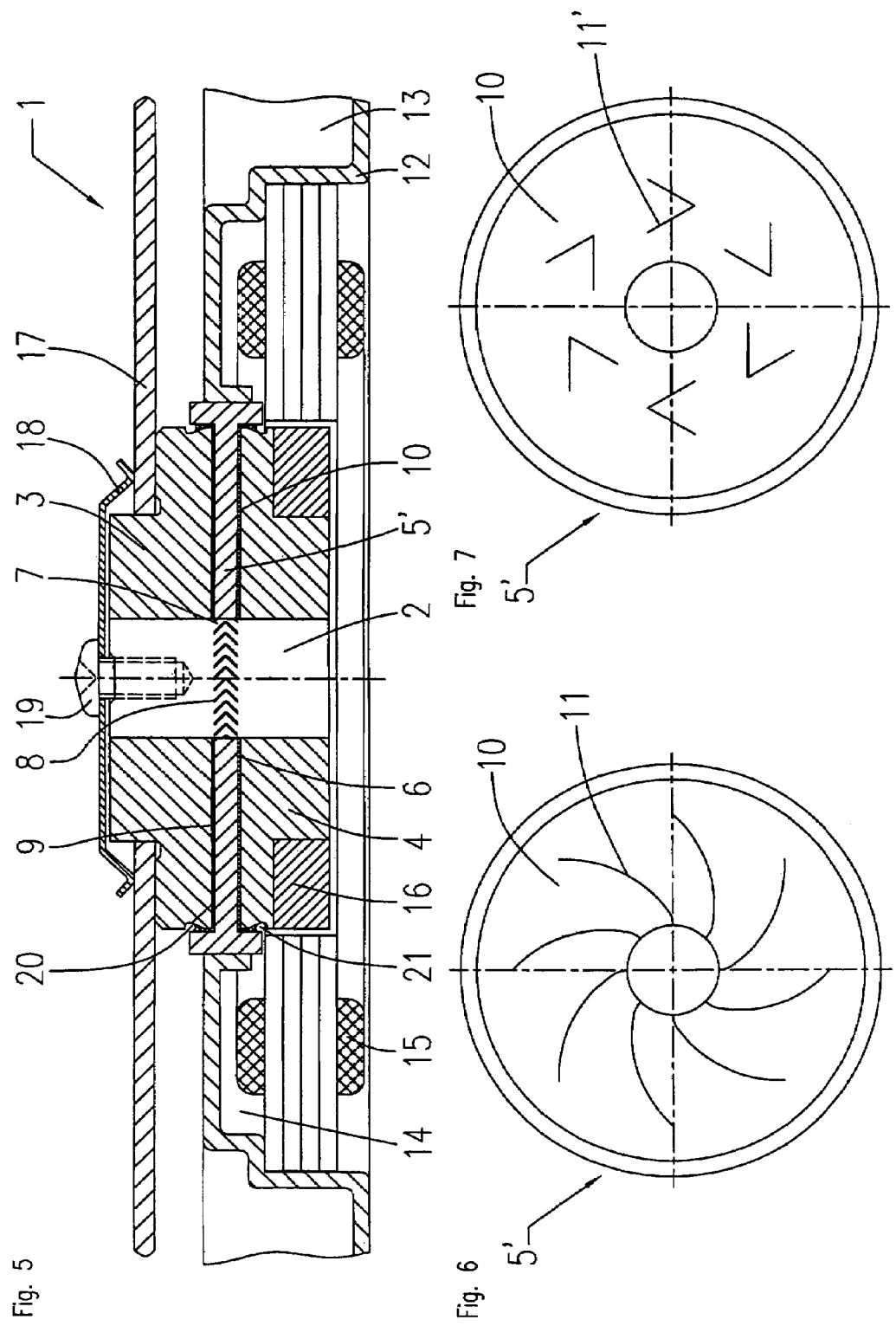

SPINDLE MOTOR HAVING A FLUID DYNAMIC BEARING SYSTEM

CROSS-REFERENCE TO RELATED APPLICATIONS

This application claims priority of German Patent Application No. 102005002586.2, filed Jan. 20, 2005, and German Patent Application No. 102005036396.2, filed Aug. 3, 2005, the contents of which are hereby incorporated herein by reference into this application.

BACKGROUND OF THE INVENTION

The invention relates to a spindle motor having a fluid dynamic bearing system, particularly a small-scale spindle motor preferably to drive hard disk drives.

DESCRIPTION OF THE RELATED ART

The ongoing miniaturization of hard disk drives is giving rise to new problems in their design and construction, particularly with regard to the manufacture of small drive motors and suitable bearing systems. Although roller bearing systems have mainly been used to date, fluid dynamic bearing systems are becoming increasingly popular due to their small-scale construction and higher precision.

It is known to provide the existing bearing systems with two radial bearings. In order to achieve the required bearing stiffness, the radial bearings have to be disposed at a sufficient axial spacing with respect to one another. However, conventional solutions in the design of fluid dynamic hard disk drive bearings and methods for their manufacture are either impossible to apply or can only be applied with difficulty in the design and construction of miniature spindle motors. The smaller the bearing systems become, the lower are their load-bearing capacity and stiffness when conventional construction methods are used.

U.S. Pat. No. 5,538,347 A reveals an air bearing that comprises a rotating annular component that rotates about a stationary cylindrical component. A radial bearing is disposed between the peripheral surfaces facing each other of the two components. The end faces of the rotating component, together with two stationary disk-shaped components, each form an axial bearing. The bearing surfaces are spaced apart from each other by a bearing gap in a well-known procedure. The dynamic air pressure required in the bearing gap is generated by surface patterns that are formed on the bearing surfaces. The dynamic air bearing described here has only limited suitability for a spindle motor to drive a hard disk drive because of the central stationary component, making it difficult to fix the storage disks onto the rotating component.

BRIEF SUMMARY OF THE INVENTION

The object of the invention is to create a spindle motor having a fluid dynamic bearing that has high bearing stiffness, particularly in the case of a small-scale construction and more particularly when the overall height is kept low. Where the spindle motor is to be used to drive a hard disk drive, mounting the storage disks should be made a simple process.

This object has been achieved by the characteristics outlined in claim 1.

Preferred embodiments and further advantageous characteristics of the invention are cited in the subordinate claims.

The spindle motor having a fluid dynamic bearing system according to the invention comprises a rotor having a cylindrical shaft, a first bearing disk disposed at one end of the shaft and a second bearing disk that is disposed on the shaft at a spacing to the first bearing disk in such a way that an annular disk-shaped space is formed between the two bearing disks; a stator having an annular disk-shaped component that is disposed in the annular disk-shaped space formed by the rotor, the bearing surfaces opposing each other of the stator and of the rotor being separated by a bearing gap filled with a fluid medium; a radial bearing formed between the outside circumference of the shaft and the inside circumference of the annular disk-shaped component; two axial bearings, formed by the two end faces of the annular disk-shaped component and the respective opposing end faces of the bearing disks; and an electromagnetic drive unit.

In a preferred embodiment of the invention, the radial bearing is defined by surface patterns on the shaft and/or on the annular disk-shaped component, the patterns generating a pumping action on the fluid medium directed towards the center of the radial bearing. Each axial bearing is also correspondingly defined by surface patterns on the annular disk-shaped component and/or on the bearing disk, the patterns generating a pumping action on the fluid medium primarily directed radially inwards in the direction of the radial bearing. The pumping actions of the two axial bearings are directed in opposite directions to one another.

The spindle motor is preferably intended for use in a hard disk drive, a rotating part of the motor driving the at least one storage disk. It is advantageous if the first bearing disk is used as a carrier for the storage disk of the hard disk drive, the storage disk being preferably fixed to the bearing disk by means of a clamp. Since the shaft rotates together with the bearing disk, the clamp can be fixed easily to a central bore in the shaft using a screw.

Another preferred embodiment of the invention provides that the second bearing disk, which together with the first bearing disk and the shaft forms the rotor of the spindle motor, carries permanent magnets at its outside circumference forming part of the electromagnetic drive unit. The annular disk-shaped component is preferably disposed in a central opening in the housing frame of the spindle motor. The housing frame forms an annular cavity in which stator windings forming part of the electromagnetic drive unit are disposed, the stator windings encircling the permanent magnets disposed on the second bearing disk and being located opposite these. An electromagnetic field is generated by energizing the stator windings accordingly, the electromagnetic field acting on the permanent magnets and driving the rotor.

The storage disk is magnetically shielded with respect to the magnetic circuit of the drive unit in that the housing frame or another soft magnetic component connected to the stator is disposed between the stator windings and the storage disk. In the former case, the need for a separate component for shielding purposes is thus precluded.

In the design and construction according to the invention, the fluid dynamic bearing has two open ends, both of which have to be sealed by sealing means to prevent bearing fluid from escaping into the motor chamber. According to the invention, dynamic sealing means are used that can be formed by the existing surface patterns of the axial bearings and that generate a pumping action on the fluid medium directed towards the inside of the bearing, resulting in the creation of a dynamic seal for the open end of the bearing gap. The sealing means could also be formed by sealing patterns separate from the bearing patterns that generate an independent pumping action directed towards the interior of the bearing system.

Annular recesses, formed radially beyond the surface patterns, can be provided in the end faces facing the bearing gap of the annular disk-shaped component or of the bearing disks, the annular recesses being at least partially filled with the fluid medium, acting as supply volumes for the fluid medium and sealing the bearing gap towards the outside.

By integrating the functions of the components, the spindle motor according to the invention is made up of only a few components. These components can be made using conventional manufacturing processes. Since the required tilt resistance is not achieved through radial bearings having a large axial spacing, but rather primarily through the axial bearings, the required overall height can be kept low. This makes for high axial stiffness. The radial stiffness that is still necessary is provided by the radial bearing.

Another advantage of the design and construction according to the invention is that the arrangement of the stator makes it unnecessary to lead the electric connection through the housing frame (baseplate).

A spindle motor according to the invention having a low overall height is particularly suitable to drive the storage disks of hard disk drives. Especially in hard disk drives for mobile applications, there is the risk that in unfavorable circumstances the housing covers become deformed (bent) due to pressure loads acting on them. This could lead to the impairment of or even damage to the rotating storage disks, to the drive motor or to the read/write heads of the hard disk drive.

To prevent this from happening, provision is made in another preferred embodiment of the invention for the shaft to be formed as a hollow shaft and for a through pin to be disposed in the center of the hollow shaft, the through pin being fixed to the opposing sides of a housing that receives the spindle motor. This pin increases the stiffness of the housing cover and prevents the housing cover from bending and thus prevents any consequent damage to the hard disk drive. As an alternative or in addition, other stiffening means can be provided outside the diameter of the rotating storage disk taking the form of at least one through pin.

The invention is described in more detail below on the basis of three embodiments with reference to the drawings. Further characteristics, advantages and possible applications of the invention can be derived from the drawings and their description.

BRIEF SUMMARY OF THE SEVERAL VIEWS OF THE DRAWINGS

The drawings show:

FIG. 1: a section through a spindle motor according to the invention having a fluid dynamic bearing system;

FIG. 2: a view of the stationary, annular disk-shaped component of the bearing system from below;

FIG. 3: a view of another embodiment of the annular disk-shaped component;

FIG. 5: a section through a third embodiment of a spindle motor according to the invention having a fluid dynamic bearing system.

FIG. 6: a view of the stationary, annular disk-shaped component of the bearing system in FIG. 5 from below;

FIG. 7: a view of another embodiment of the annular disk-shaped component.

DETAILED DESCRIPTION OF THE INVENTION

Figure 4:
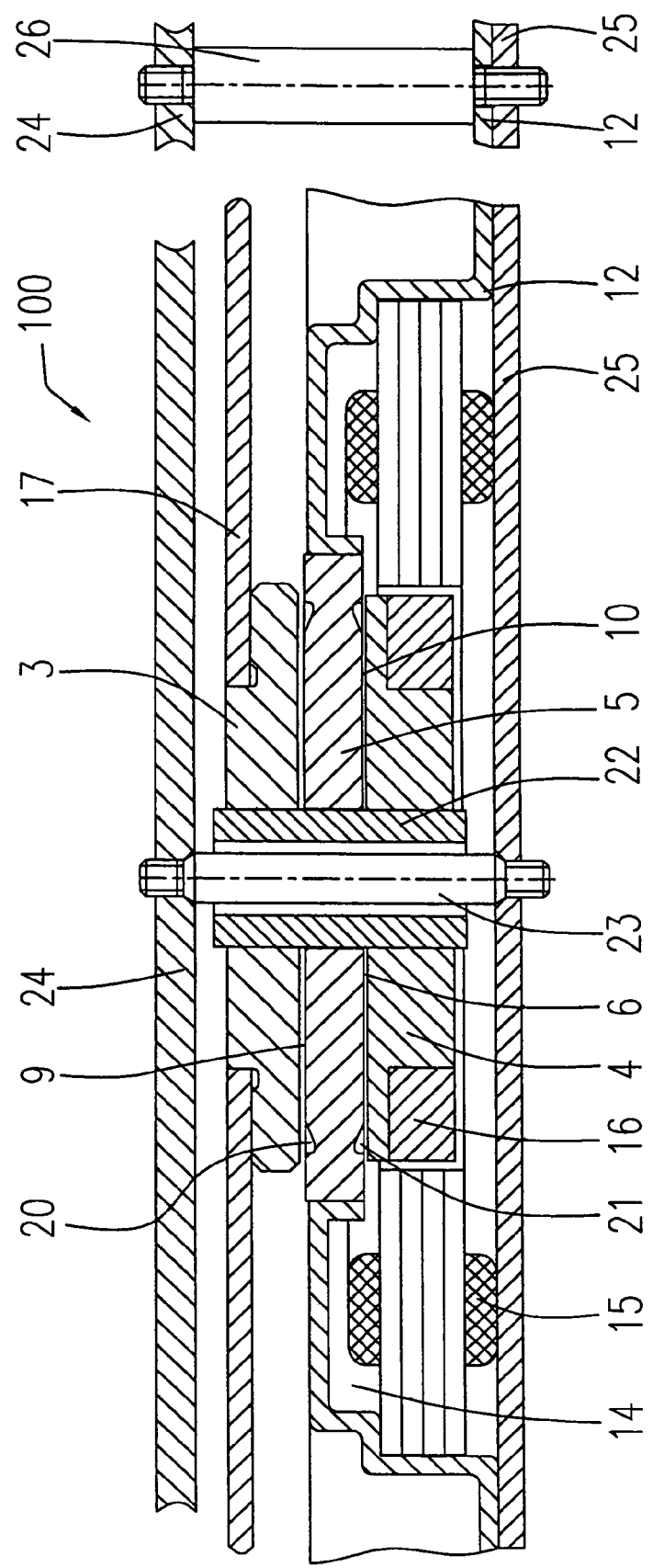
FIG. 4: a section through a further embodiment of a spindle motor according to the invention having a fluid dynamic bearing system.

FIG. 1 shows the basic construction of a spindle motor 1 according to the invention. The spindle motor 1 is characterized by its simple design and construction and includes a fluid dynamic bearing system. The rotor of the spindle motor is formed by a cylindrical shaft 2, a first bearing disk 3 disposed at one end of the shaft and a second bearing disk 4 that is disposed on the shaft 2 at a spacing to the first bearing disk 3 in such a way that an annular disk-shaped space is formed between the two bearing disks.

The stator of the spindle motor comprises a stationary bearing part taking the form of an annular disk-shaped component 5 that is accommodated in the annular disk-shaped space formed by the rotor. The respective opposing bearing surfaces of the stator and the rotor are separated from one another by a bearing gap 6 filled with a fluid medium, such as bearing oil or even air.

The fluid dynamic bearing system comprises a radial bearing 7 that is formed between the outside circumference of the shaft 2 and the inside circumference of the annular disk-shaped component 5. The radial bearing 7 is defined in a well-known manner by surface patterns 8 that are disposed on the shaft 2 and/or on the annular disk-shaped component 5. The surface patterns 8 are formed in such a way that, when the shaft 2 is set in rotation, they exert a pumping action on the fluid medium directed to the center of the radial bearing. In accordance with FIG. 1, the surface patterns 8 are formed as slanting groove patterns that are preferably symmetric with respect to each other and that generate hydrodynamic pressure directed towards the center of the radial bearing when the shaft 2 rotates to the left.

The bearing system further comprises two axial bearings 9, 10 that are formed by the two end faces of the annular disk-shaped component 5 and the respective end faces of the bearing disks 3 or 4 located opposite these surfaces. Each axial bearing 9 or 10 is also defined by surface patterns 11 or 11' that are disposed on the annular disk-shaped component 5 and/or on the bearing disks 3, 4. As can be seen from FIGS. 2 and 3, the surface patterns 11 can be disposed, for example, on the surface of the annular disk-shaped component 5 and be given a spiral shape. When the second bearing disk 4 rotates anticlockwise with respect to the annular disk-shaped component 5, these spiral-like patterns 11 exercise a hydrodynamic pumping action on the fluid medium that is primarily directed radially inwards in the direction of the radial bearing 7. Together with the radial bearing 7, the axial bearings 9 or 10, having a relatively large diameter and acting (pumping) towards the bearing interior ensure high axial and radial stiffness and tilt resistance of the bearing.

An annular disk-shaped component 5 that has herringbone patterns arranged in a circle to generate fluid dynamic pressure is shown in FIG. 3 as an alternative.

The stationary annular disk-shaped component 5 forming a part of the stator is disposed in an opening in a housing frame 12. The housing frame 12 forms part of a baseplate 13 of the spindle motor or is fixedly connected to the baseplate. The housing frame 12 preferably consists of a profiled metal piece, an annular cavity 14 being formed substantially below the plane of the bearing component 5.

The rotor of the spindle motor 1 is driven by an electromagnetic drive unit. The drive unit comprises stator windings 15 on appropriate lamination stacks that are disposed in the cavity 14 in the housing frame 12. The stator windings 15 are distributed in a circle about the second bearing disk 4.

The second bearing disk 4 carries permanent magnets 16 on its outside circumference, the permanent magnets 16 forming the second part of the electromagnetic drive unit. The permanent magnets 16 are arranged such that they lie directly opposite the stator windings 15 and are only separated from the stator windings 15 by a small air gap. An electromagnetic field is generated by energizing the stator windings 15 accordingly, the electromagnetic field acting on the permanent magnets 16 and driving the rotor.

The spindle motor 1 can preferably be used to drive one or more storage disks 17 of a hard disk drive. Here, the first bearing disk 3 is preferably used as a carrier for the storage disk 17. The bearing disk 3 has a step on which the storage disk 17 rests. A clamp 18 is provided to fix the storage disk 17 to the bearing disk, the clamp being fixed to a central bore in the shaft 2 by means of a screw 19. The housing frame 12 is formed in such a way that it separates the stator windings 15 and the storage disk 17 from one another and thus provides magnetic shielding for the storage disk.

The seal for the two openings in the bearing gap 6 is achieved by means of a dynamic seal. Through the inwards-directed pumping action of the surface patterns of the two axial bearings 9 and 10, the fluid medium found in the bearing gap 6 is pressed into the bearing interior and in this way prevents bearing fluid from escaping outwards from the bearing gap 6 into the motor chamber.

However, the seal can also be achieved by separate surface patterns (not illustrated) which do not form part of the axial bearings 9 or 10. In dynamically sealed fluid bearings, an equilibrium is achieved during operation in which the pressure differences in the bearing gap are equalized. This requires appropriate supply volumes 20, 21 for the bearing fluid, which, in the illustrated embodiment, are provided at the two open ends of the bearing gap 6. The supply volumes 20, 21 are provided, for example, in the end faces facing the bearing gap 6 of the annular disk-shaped component 5 or of the bearing disks 3, 4, radially beyond the surface patterns 11, 11'. The supply volumes 20, 21 can take the form of annular recesses or grooves, as can be clearly seen in FIG. 2, they are at least partially filled with the fluid medium and define the bearing gap 6 towards the outside.

As an alternative, capillary seals can be used that can be molded into components 3 and 4 and/or 5 in the form of conical extensions to the axial bearing gap 6 that widen radially outwards.

FIG. 4 shows an embodiment modified with respect to FIG. 1 of a spindle motor 100 according to the invention to drive at least one storage disk of a hard disk drive, reference being made here to the details given in conjunction with FIG. 1. In FIGS. 1 and 4, the same parts are indicated by the same reference numbers.

In contrast to FIG. 1, the shaft in the spindle motor 100 according to FIG. 4 is formed as a hollow shaft 22. A through pin 23 extends through the center of the hollow shaft 22, the outside diameter of the pin being significantly smaller than the inside diameter of the hollow shaft 22 so that the pin 23 does not touch the inside wall of the shaft 22. The motor, forming part of the hard disk drive, is disposed in a closed housing, only an upper and a lower housing part 24, 25 being illustrated in FIG. 4. The through pin is fixed to the two opposing housing parts 24, 25, resulting in substantial stiffening of the housing and preventing the housing cover 24, 25 from bending, which can be caused, for example, by outside pressure loads or shocks.

As an alternative or in addition, provision can be made for at least one (more) through pin 26 to be provided beyond the diameter of the rotating storage disk 17, this pin also being fixed to the opposing sides 24, 25 of the housing and acting to increase the housing stiffness.

FIG. 5 shows another embodiment modified with respect to FIG. 1 of a spindle motor 1 according to the invention to drive at least one storage disk of a hard disk drive, reference being made here to the details given in conjunction with FIG. 1. In FIGS. 1 and 5, the same parts are indicated by the same reference numbers.

In contrast to FIG. 1, in the spindle motor 1 according to FIG. 5, the annular disk-shaped component 5' is made relatively narrow and larger in diameter than the two bearing disks 3 and 4. The projecting outer edge of component 5' is cylindrical in shape, an axially extending gap that is connected to the bearing gap 6 remaining between the inside diameter of the cylinder and the outside diameter of the respective bearing disks 3 and 4.

The two openings in the bearing gap 6 are sealed on the one hand by a dynamic sealing effect that is generated by the inwards-directed pumping action of the surface patterns of the two axial bearings 9 and 10, as described in conjunction with FIG. 1. The axial gaps, further, have capillary seals that are formed by supply volumes 20, 21 molded into the outside diameter of the bearing disks 3 and 4 taking the form of conical extensions to the gap.

FIGS. 6 and 7 show a view from above of two possible embodiments of the annular disk-shaped component 5', which differ from one another in the shape of the surface patterns 11 or 11' of the axial bearing 10. The surface patterns 11 in FIG. 6 are shaped like a spiral, for example, whereas the surface patterns 11' in FIG. 7 consist of herringbone patterns arranged in a circle.

IDENTIFICATION REFERENCE LIST

1 Spindle motor
2 Shaft
3 Bearing disk (first)
4 Bearing disk (second)
5 Annular disk-shaped component
6 Bearing gap
7 Radial bearing
8 Surface patterns
9 Axial bearing
10 Axial bearing
11 11', Surface patterns
12 Housing frame
13 Baseplate
14 Cavity
15 Stator windings
16 Permanent magnets
17 Storage disk
18 Clamp
19 Screw
20 Supply volume
21 Supply volume
22 Hollow shaft
23 Pin
24 Housing (top)
25 Housing (bottom)
26 Pin
100 Spindle motor

The invention claimed is:

1. A spindle motor having a fluid dynamic bearing system comprising:

a rotor having a cylindrical shaft (2), a first bearing disk (3) disposed at one end of the shaft and a second bearing disk (4) that is disposed on the shaft at a spacing to the first bearing disk in such a way that an annular disk-shaped space is formed between the two bearing disks (3; 4);

a stator having an annular disk-shaped component (5) that is disposed in the annular disk-shaped space formed by the rotor, the respective opposing bearing surfaces of the stator and of the rotor being separated from one another by a bearing gap (6) filled with a fluid medium;

at least one radial bearing (7) formed between the outside circumference of the shaft (2) and the inside circumference of the annular disk-shaped component (5); and two axial bearings (9; 10) formed by the two end faces of the annular disk-shaped component (5) and the respective opposing end faces of the bearing disks (3; 4); and an electromagnetic drive unit characterized in that the radial bearing (7) is defined by surface patterns (8) formed on the shaft (2) and/or on the annular disk-shaped component (5), the surface patterns generating a pumping action on the fluid medium directed towards the center of the radial bearing.

2. A spindle motor according to claim 1, characterized in that each axial bearing (9; 10) is defined by surface patterns (11, 11') formed on the annular disk-shaped component and/or on the bearing disks, the surface patterns generating a pumping action on the fluid medium that is primarily directed radially inwards in the direction of the radial bearings (7).

3. A spindle motor according to claim 2, characterized in that the pumping actions of the two axial bearings (9; 10) are directed opposed to each other.

4. A spindle motor according to claim 1, characterized in that the spindle motor forms a part of a hard disk drive.

5. A spindle motor according to claim 4, characterized in that the first bearing disk (3) is formed as a carrier for a storage disk (17) of the hard disk drive, the storage disk being fixed by means of a clamp (18) to the bearing disk.

6. A spindle motor according to claim 5, characterized in that the clamp is fixed to a central bore in the shaft (2) by means of a screw (19).

7. A spindle motor according to claim 1, characterized in that the second bearing disk (4) carries permanent magnets (16) on its outside circumference, the permanent magnets forming a part of the electromagnetic drive unit.

8. A spindle motor according to claim 1, characterized in that the annular disk-shaped component (5) is disposed in an opening of a housing frame (12).

9. A spindle motor according to claim 8, characterized in that stator windings (15) on appropriate stator lamination stacks forming a part of the electromagnetic drive unit are disposed in an annular cavity in the housing frame, the stator windings (15) encircling permanent magnets (16) that are disposed on the second bearing disk and being located opposite these.

10. A spindle motor according to claim 9, characterized in that the housing frame (12) is disposed between the stator windings (15) and the storage disk (17) and creates a magnetic shield.

11. A spindle motor according to claim 1, characterized in that sealing means are provided that are formed by surface patterns which are disposed at the open end of the bearing gap (6) on at least one of the bearing components (3; 4; 5) and which are designed in such a way that they generate a pumping action on the fluid medium directed towards the interior of the bearing thus creating a dynamic seal for the open ends of the bearing gap (6).

12. A spindle motor according to claim 11, characterized in that the sealing means are formed by the surface patterns (11, 11') of the axial bearings (9; 10).

13. A spindle motor according to claim 11, characterized in that the sealing means are formed by surface patterns which are separate from the surface patterns (11, 11') of the axial bearings and which generate a pumping action on the fluid medium in the direction of the radial bearing (7).

14. A spindle motor according to claim 11, characterized in that annular recesses (20, 21), formed radially beyond the surface patterns (11, 11'), are provided in the end faces facing the bearing gap (6) of the annular disk-shaped component (5) or of the bearing disks (3; 4), the annular recesses being at least partially filled with the fluid medium, acting as supply volumes for the fluid medium and defining the bearing gap (6) towards the outside.

15. A spindle motor according to claim 1, characterized in that a conical recess is molded in the bearing components (3 and 4 and/or 5), the conical recess widening radially outwards and being connected to the bearing gap 6.

16. A spindle motor according to claim 1, characterized in that the shaft is formed as a hollow shaft (22) and a through pin (23) is disposed in the center of the hollow shaft, the through pin being fixed to the opposing sides of a housing (24, 25) that receives the spindle motor (100).

17. A spindle motor according to claim 16, characterized in that at least one through pin (26) is disposed beyond the diameter of the rotating storage disk (17), the through pin being fixed to the opposing sides of a housing (24, 25) that receives the spindle motor (100).

\* \* \* \* \*

(12) EX PARTE REEXAMINATION CERTIFICATE (8971st)
United States Patent
Engesser et al.

(10) Number: US 7,570,456 C1
(45) Certificate Issued: Apr. 17, 2012

(54) SPINDLE MOTOR HAVING A FLUID DYNAMIC BEARING SYSTEM

(75) Inventors: Martin Engesser, Donaueschingen (DE); Stefan Schwamberger, Hermsdorf (DE)

(73) Assignee: Minebea Co., Ltd., Miyota-Machi, Kitasaku-Gu, Nagano-Ken (JP)

Reexamination Request:
No. 90/009,893, Apr. 12, 2011

Reexamination Certificate for:
Patent No.: 7,570,456
Issued: Aug. 4, 2009
Appl. No.: 11/325,126
Filed: Jan. 4, 2006

(30) Foreign Application Priority Data

Jan. 20, 2005 (DE) .................................. 10 2005 002 586
Aug. 3, 2005 (DE) .................................. 10 2005 036 396

(51) Int. Cl.
*G11B 17/02* (2006.01)

(52) U.S. Cl. .................................................... 360/99.08
(58) Field of Classification Search ................. 360/99.08
See application file for complete search history.

(56) References Cited

To view the complete listing of prior art documents cited during the proceeding for Reexamination Control Number 90/009,893, please refer to the USPTO's public Patent Application Information Retrieval (PAIR) system under the Display References tab.

*Primary Examiner* — John S Heyman

(57) ABSTRACT

The invention relates to a spindle motor having a fluid dynamic bearing system and comprises a rotor having a cylindrical shaft, a first bearing disk disposed at one end of the shaft and second bearing disk that is disposed on the shaft at a spacing to the first bearing disk in such a way that an annular disk-shaped space is formed between the two bearing disks. A stator is provided that has an annular disk-shaped component which is disposed in the annular disk-shaped space formed by the rotor, the respective opposing bearing surfaces of the stator and of the rotor being separated from one another by a bearing gap filled with a fluid medium. The bearing system comprises at least one radial bearing formed between the outside circumference of the shaft and the inside circumference of the annular disk-shaped component and two axial bearings formed by the two end faces of the annular disk-shaped component and the respective opposing end faces of the bearing disks, an electromagnetic drive unit being provided to drive the rotor.

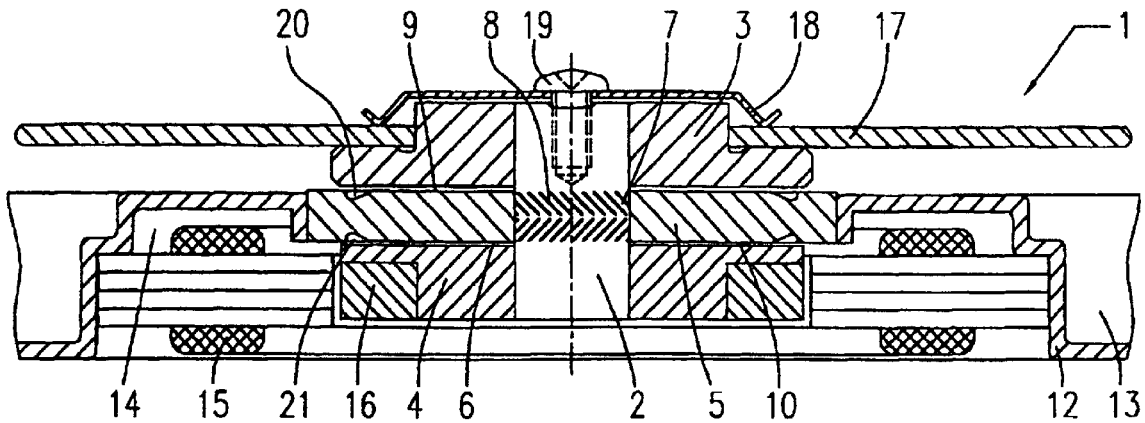

EX PARTE REEXAMINATION CERTIFICATE ISSUED UNDER 35 U.S.C. 307

THE PATENT IS HEREBY AMENDED AS INDICATED BELOW

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8, 9 and 10 are cancelled.

Claim 1 is determined to be patentable as amended.

Claims 2-4 and 7, dependent on an amended claim, are determined to be patentable.

Claims 5, 6 and 11-17 were not reexamined.

1. A spindle motor having a fluid dynamic bearing system comprising:
   a rotor having a cylindrical shaft (2), a first bearing disk (3) disposed at one end of the shaft and a second bearing disk (4) that is disposed on the shaft at a spacing to the first bearing disk in such a way that an annular disk-shaped space is formed between the two bearing disks (3; 4);
   a stator having an annular disk-shaped component (5) that is disposed in the annular disk-shaped space formed by the rotor, the respective opposing bearing surfaces of the stator and of the rotor being separated from one another by a bearing gap (6) filled with a fluid medium;
   at least one radial bearing (7) formed between the outside circumference of the shaft (2) and the inside circumference of the annular disk-shaped component (5); and two axial bearings (9; 10) formed by the two end faces of the annular disk-shaped component (5) and the respective opposing end faces of the bearing disks (3; 4); and
   an electromagnetic drive unit
   characterized in that the radial bearing (7) is defined by surface patterns (8) formed on the shaft (2) and/or on the annular disk-shaped component (5), the surface patterns generating a pumping action on the fluid medium directed towards the center of the radial bearing, *wherein the annular disk-shaped component (5) is disposed in an opening of a housing frame (12), wherein stator windings (15) on appropriate stator lamination stacks forming a part of the electromagnetic drive unit are disposed in an annular cavity in the housing frame, the stator windings (15) encircling permanent magnets (16) that are disposed on the second bearing disk and being located opposite these, and wherein the housing frame (12) is disposed between the stator windings (15) and the storage disk (17) and creates a magnetic shield.*

\* \* \* \* \*